United States Patent Office 3,155,892
Patented Nov. 3, 1964

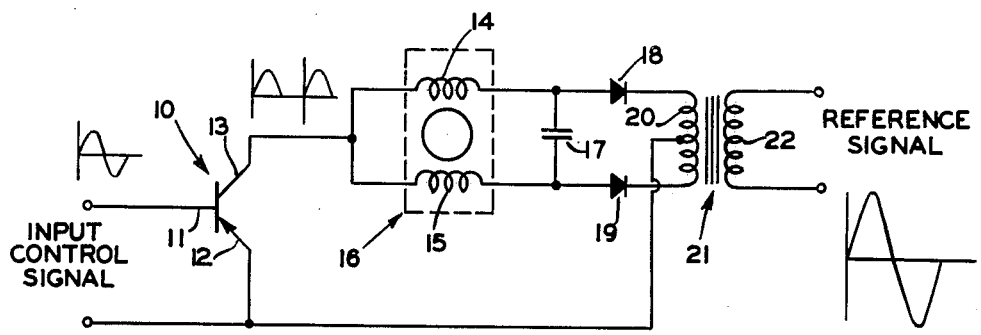
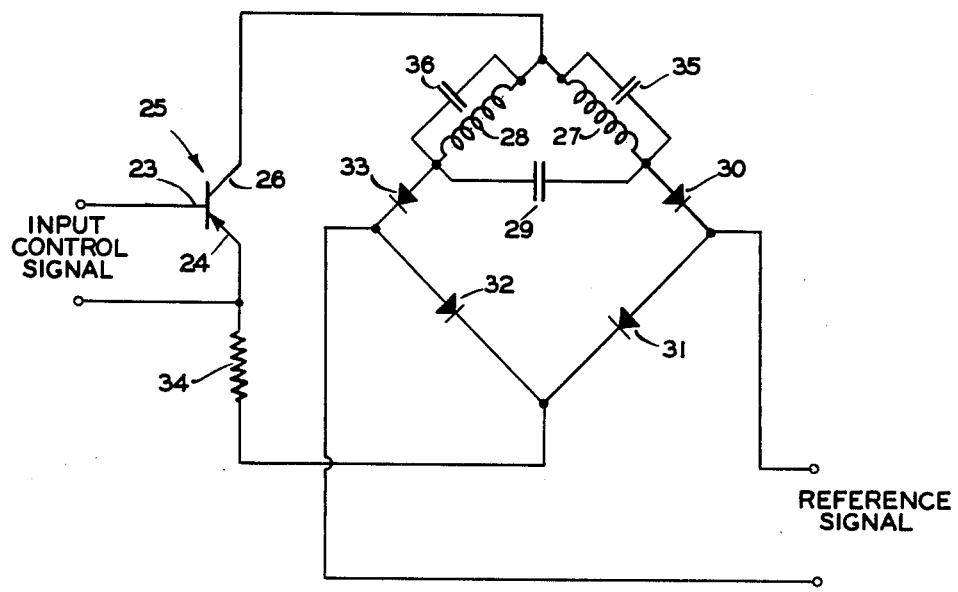

3,155,892
MOTOR CONTROL SYSTEM
John C. Karlson, Miller Place, N.Y., assignor to The Bendix Corporation, a corporation of Delaware
Filed May 22, 1959, Ser. No. 815,033
8 Claims. (Cl. 318—207)

This invention relates generally to a motor control system and particularly to a reversible two-phase motor control system.

It is well known in the motor control art that in order to control the movement of a two-phase motor it is necessary to cause a 90 degree phase shift between control signals fed to the first winding and second winding of a two-phase motor. Heretofore it has been the practice in the controlling of direction of rotation of such motors to connect a first winding in series with a capacitor in order to obtain the necessary 90 degree phase shift and to connect the series combination across a reference voltage. The signal for controlling the motor being called a control signal is arranged to be fed to the second winding in such a manner that the amplitude controls the speed of rotation and the phase relationship with respect to the reference voltage determines the direction of rotation. In these aforementioned systems a current is always flowing through the winding connected to the reference voltage even in the absence of a control signal and, as a consequence, such motors have a tendency to overheat and run hot. This overheating has heretofore always been accepted as a natural phenomenon and has resulted in the over-designing of such two-phase motors with the resultant size and weight penalty in order to effectively dissipate the heat.

In this invention there is disclosed a motor control system comprising a two-phase motor having a first winding and a second winding, and control means responsive to a control signal and a reference signal for impressing an operating signal across either said first winding or said second winding depending on the phase relationship between said operating signal and said reference signal, said first winding and said second winding being reactively coupled together whereby a portion of the operating signal impressed across said first winding will appear on said second winding substantially 90 degrees out of phase therefrom and conversely a portion of the operating signal impressed on said second winding will appear on said first winding substantially 90 degrees out of phase therefrom. In this manner current will flow in either of the motor control windings only if a control signal is present.

Further objects and advantages of this invention will be made more apparent by referring now to the accompanying drawing wherein FIG. 1 is a schematic diagram of a first embodiment of this invention illustrating a center-tapped transformer for driving a two-phase motor, and FIG. 2 is a schematic diagram of a second embodiment of this invention illustrating a bridge circuit in place of the center-tapped transformer shown in FIG. 1.

Referring now to FIG. 1, there is shown a circuit diagram that represents the basic concept for driving a two-phase motor according to the principles of this invention. Power transistor 10 functions as switching means and is arranged to have an input control signal developed across base element 11 and emitter element 12 of said transistor. The output signal appearing at collector element 13 is connected to a junction of motor windings 14 and 15 of two-phase motor 16. The opposing ends of said windings are connected together by means of a reactive element 17 shown as a capacitor. A unilateral conducting member 18 illustrated as a diode is attached to the junction of winding 14 and capacitor 17. In a similar manner, unilateral conducting element 19 shown as a diode is connected to the junction of winding 15 and the other end of capacitor 17. Diodes 18 and 19 are connected to opposite ends of a center-tapped coil 20 of transformer 21 in a full wave rectifier configuration. Primary coil 22 of transformer 21 is arranged to be connected to a reference signal. The center-tapped connection of coil 20 is attached to emitter element 12 of transistor 10 thereby completing the return circuit.

In operation the power transistor 10 is preferably operated with zero bias on the base element 11 to prevent conduction in the absence of an incoming signal and to pass only positive excursions of said signal.

As will be apparent, the reference signal will determine which diode will be capable of conducting current. The operation of motor 16 will occur when power is applied to both windings 14 and 15 and in the proper phase relationship, the direction of rotation depending upon which winding is operated first or, in other words, rotation will be determined by whichever winding receives the operating signal directly. Considering now the condition where the input control signal is in phase with the reference signal so that diode 18 will conduct at the same time the input control signal is going positive, it can be shown that current will flow directly through winding 14 whereas a quadrature current will flow through winding 15 due to the action of capacitor 17. The actual value of capacitor 17 will determine the proper quadrature operating point for the particular motor used. Since both windings of the motor are energized in the proper phase relationship to each other, the motor will rotate in a given direction. Considering now the condition where the input control signal is of opposite phase to the reference signal, it can be shown that diode 19 will conduct and that current will flow directly through winding 15 and that a quadrature current will flow through winding 14 due to the action of capacitor 17 as described above. The rotation of the motor will thereby reverse since winding 14 is now being energized before winding 15. In this mode of operation with zero bias on power transistor 10 it will be apparent that current will flow through the control windings 14 or 15 only when an input control signal is available and that in the absence of a control signal no current will flow, thereby resulting in no current flowing in either of the windings. The motor and servomechanism, therefore, runs cooler and requires less operating power.

Referring now to FIG. 2, there is shown a schematic diagram of a second embodiment of this invention arranged as a bridge circuit and requiring four unilateral current-carrying members in place of the center-tapped transformer 21 shown in FIG. 1. In this circuit the input control signal is impressed across base element 23 and emitter element 24 of transistor 25. The output of said transistor appearing at collector element 26 is connected to the junction of motor windings 27 and 28 of the two-phase motor being controlled. The opposite ends of windings 27 and 28 are joined together by means of a reactive element 29 illustrated as a capacitor which serves the same purpose as capacitor 17 shown in FIG. 1. Unilateral current conducting members 30, 31, 32 and 33, illustrated as diodes, are connected in circuit with motor windings 27 and 28 to thereby define a bridge circuit. Diode 30 is connected in series with motor winding 27 and diode 31. In a similar manner diode 33 is connected in series with motor winding 28 and diode 32. The junction of diodes 31 and 32 are attached to one end of emitter resistor 34, the other end of which is connected to emitter element 24 of transistor 25, thereby completing the return circuit. The reference signal is connected to the bridge circuit between the junctions of diodes 30 and 31 and the junctions of diodes 32 and 33. The operation of the bridge circuit is straightforward and basically the same as that described for FIG. 1. This circuit was found to have good quadrature rejection of unwanted quadrature signals in the input control signal as well as high operating speed. In order to optimize the design, it was found desirable to add a capacitor 35 across motor winding 27 and a capacitor 36 across motor winding 28. These capacitors have the effect of improving the torque developed in the motor and it is believed this occurs by increasing the time in each cycle that the individual windings actually receive an electrical driving signal.

In considering the operation of the embodiments illustrated in FIGS. 1 and 2, the input control signal was applied to a zero bias transistor. It should be pointed out, however, that the input transistor may also be operated as a modified Class A amplifier. When operating Class A it will be apparent that current will flow through one winding of the motor tending to drive the motor in a given direction for one-half of the cycle and in the opposite direction for the second half of the cycle. Directional control of the motor will occur since the currents will be unequal due to the combining of the input signal with the reference signal. The positive excursions of the control signal will add to the reference signal whereas the negative excursions of the control signal will subtract from the reference signal. In this mode of operation an increased current will flow through the motor but only when the motor is actually being controlled by an input control signal. For certain applications a modified Class A operation may be desirable since the power savings over present-day systems will still be appreciable when it is considered that current does not flow in either of the motor windings unless a control signal is present.

This completes the description of the invention disclosed and illustrated herein. However, many modifications and changes may be made which will be apparent to those skilled in the art without departing from the spirit and scope of this invention.

What is claimed is:

1. A motor control system comprising a two-phase motor having a first winding and second winding reactively coupled together, a circuit comprising a transformer having a primary winding adapted to be connected to a reference signal source and a center-tapped output winding having a first portion connected in series with a first unilateral current-carrying member and said first winding and a second portion connected in series with a second unilateral current-carrying member and said second winding, switching means responsive to a control signal and connected to said motor windings, and to the center tap of the output winding for selectively controlling the flow of current in said first and second windings.

2. A reversible two-phase motor control system comprising a transistor input circuit having a base element, an emitter element and a collector element and adapted to have a control signal impressed across said base and said emitter elements, a two-phase motor having a first winding and a second winding connected together at one end to said collector element, means for reactively coupling the opposing ends of said first winding and said second winding of said motor, a transformer having a primary winding adapted to be connected to a reference signal source and a center-tapped secondary winding having one end connected to a first unilateral conducting member in series with said first winding and the other end connected to a second unilateral conducting member in series with said second winding, and the center-tap being connected to the emitter element of said transistor.

3. A reversible two-phase motor control system comprising a transistor input circuit having at least a base element, an emitter element and a collector element and adapted to have a control signal impressed across said base and said emitter element, a two-phase motor comprising a first winding and a second winding connected together at one end to said collector element, means for capacitively coupling the opposing ends of said first winding and said second winding of said motor, a transformer having a primary winding adapted to be connected to a reference signal source and a center-tapped secondary winding having one end connected to a diode in series with said first winding and the other end connected to a second diode in series with said second winding, and the center-tap being connected to the emitter element of the transistor.

4. A motor control system comprising a two-phase motor having a first winding and a second winding, said first winding being connected in series with a first diode to form a first leg of a bridge circuit, said second winding being connected in series with a second diode to form a second leg of said bridge circuit, a third diode forming the third leg and being connected in series with said first leg, a fourth diode forming the fourth leg and being connected in series with said second leg, means for applying a control signal across the junctions of said third and fourth legs and said first and said second legs, means for applying a reference signal across the junctions of legs 1 and 3 and legs 2 and 4, and means for reactively coupling the first and second motor windings together.

5. A motor control system comprising a two-phase motor having a pair of windings, means reactively coupling the windings together, diode means connected to the windings and to a reference source, and a transistor connected to the windings and responsive to a control signal for controlling current flow through the diode means from the reference source to de-energize both windings in the absence of a signal and to energize the windings in quadrature when a signal is applied.

6. A motor control system comprising a two-phase motor having a pair of windings, means reactively coupling the windings together, diode means connected to the windings and to a reference source, and a transistor connected to the windings and responsive to a control signal of reversible phase for controlling current flow through the diode means from the reference source to de-energize both windings in the absence of a signal and to energize the windings in quadrature when a signal is applied to operate the motor in one direction or the other determined by the phase of the signal relative to the reference source.

7. In a control system for a two-phase motor having a pair of windings and means for selectively connecting either one of said windings across an alternating current reference source and the other winding across the source through a phase shifting condenser, said means comprising a pair of diodes connected in series with the motor windings and poled to conduct on alternate half cycles of the alternating current reference source, and switching means responsive to an input signal of reversible phase for completing the circuit between the reference source and motor windings and rendering both diodes nonconducting in the absence of a signal and rendering one of the diodes conducting when a signal of one phase is applied and rendering the other diode conducting when a signal of opposite phase is applied.

8. A control system for a two phase motor having a pair of windings and means for selectively connecting either one of said windings across an alternating current reference source and the other winding across the source through a phase shifting condenser, said means comprising a diode connected in series with each motor winding, the diodes being poled to conduct on alternate half cycles of the alternating current reference source, and switching means responsive to an input signal of reversible phase for completing the circuit between the reference source and motor windings and controlling current flow through the diodes from the reference source to deenergize both windings in the absence of a signal and to energize the windings in quadrature when a signal is applied to operate the motor in one direction or the other determined by the phase of the signal relative to the reference source.

References Cited in the file of this patent

UNITED STATES PATENTS

| | | |
|---|---|---|
| Re. 23,275 | Field | Oct. 3, 1950 |
| 2,455,646 | Beard et al. | Dec. 7, 1948 |
| 2,627,594 | Sawyer et al. | Feb. 3, 1952 |
| 2,683,843 | Geyger | July 13, 1954 |
| 2,774,021 | Ehret | Dec. 11, 1956 |
| 2,807,764 | Engle | Sept. 24, 1957 |
| 2,956,222 | Hill et al. | Oct. 11, 1960 |
| 3,004,204 | Claflin et al. | Oct. 10, 1961 |